UNITED STATES PATENT OFFICE.

GEORGE FRED BRINDLEY, OF NIAGARA FALLS, ONTARIO, CANADA, ASSIGNOR TO THE ROESSLER & HASSLACHER CHEMICAL COMPANY, A CORPORATION OF NEW YORK.

COMPOSITION OF MATTER FOR GENERATING HYDROGEN.

No. 909,536.  Specification of Letters Patent.  Patented Jan. 12, 1909.

Application filed May 2, 1906, Serial No. 314,891. Renewed June 6, 1908. Serial No. 437,198.

*To all whom it may concern:*

Be it known that I, GEORGE FRED BRINDLEY, a subject of the King of Great Britain, residing at Niagara Falls, Province of Ontario, Canada, have invented a certain new and useful Composition of Matter, of which the following is a specification.

This invention relates to a composition of matter which, when brought into contact with a suitable liquid, will cause the generation of hydrogen gas.

It is well known that if an alkali or earth alkali metal is brought into contact with a suitable liquid, such as water, that hydrogen gas will be generated, sodium for instance generating hydrogen gas according to the equation $$Na + H_2O = H + NaOH.$$

It is also well known that if any metal which can form an hydroxid wherein the hydrogen can be replaced by an alkali or earth alkali metal is brought into contact with a solution of a suitable hydroxid that hydrogen gas is generated, aluminum for instance reacting with sodium hydroxid according to the equation $$Al + 3NaOH = 3H + Na_3AlO_3$$

and silicon reacting with sodium hydroxid according to the formula $$Si + 2NaOH + H_2O = H_4 + Na_2SiO_3.$$

If an alkali such as sodium in its usual form is brought into contact with water it reacts with great violence rendering this a highly inconvenient and dangerous way of generating hydrogen gas.

It is one of the purposes of this invention to overcome this objection, another purpose being to obtain an increased yield of hydrogen gas as will hereinafter appear.

In the following I have described one illustrative means of carrying out the invention, the features thereof being more fully pointed out hereinafter in the claims.

An alkali such as sodium is heated until it is in a condition such that it can be broken up into a fine state of division and is then mixed with a substance which will not react with the alkali, such as a crude hydrocarbon oil or melted paraffin, in order to cover the sodium particles with a protective coating. An inert substance, such as infusorial earth, is similarly treated with crude oil or melted paraffin and the whole mass is then mixed together in any suitable proportions, such as sixty parts of alkali to forty parts of infusorial earth, and compressed into suitable tablets or briquets. Such a tablet when brought into contact with water or other suitable liquid will generate hydrogen gas quickly and easily.

In order to increase the yield of hydrogen gas a metal, preferably in powdered form, such as aluminum or silicon, which has the property of forming an hydroxid wherein the hydrogen can be replaced by an alkali or earth alkali metal, or a mixture of such metals, may be added to the mixture, preferably added to the alkali before it is mixed with the inert substance. When sodium is used as the alkali the best proportions to be used when aluminum is added alone is 69 parts of sodium to 27 parts of aluminum; when silicon is used alone 46 parts of sodium to 28 parts of silicon, and when aluminum and silicon are used together 115 parts of sodium, 27 parts of aluminum and 28 parts of silicon, the principle of the mixture being that as the alkali generates hydrogen gas and forms an hydroxid solution, the latter reacts with the metal or mixture of metals and generates hydrogen gas substantially according to the illustrative equations given above. Instead of adding the metal or metals in a finely divided state they may be utilized in the form of tubes to contain the alkali or earth alkali metal mixture, the reactions described taking place when the tube and its contents are brought into contact with a suitable liquid.

If in mixing either the alkali or earth alkali metal or the inert substance with the protective and binding material a surplus of the latter is present in either mixture it may be dispensed with in the other the object of using the protective material being to prevent the alkali or earth alkali metal from reacting with the other parts of the mixture and to form a means of holding the mass together.

In using the tablets described above it sometimes happens that particles of the alkali or earth alkali metal escape and burn on the surface of the liquid. In order to avoid this the tablets may be placed in a wire gauze casing or cage which permits the free access of the liquid to the tablet and the escape of the gas but does not permit the particles of the alkali or earth alkali metal to escape.

As dilute solutions of hydroxid react slowly with the metal or metals it may be advisable to use a solution of hydroxid as the liquid for the reaction in order to obtain a more concentrated solution than if water was used alone as the liquid with which the tablet was brought into contact.

Where the word "alkali" is used in the claims I intend to include as well the earth alkali metals, and I do not restrict myself to any one of the alkalis or earth alkali metals, to any particular inert substance, to any particular protective agent, to any particular metal having the property described, to any particular liquid to be used in the reaction nor to any proportions nor mixtures of parts.

What I claim and desire to secure by Letters Patent is:—

1. A composition of matter containing an alkali metal, an inert substance and an agent for temporarily preventing the oxidation of the alkali metal.

2. A composition of matter containing an alkali metal, an inert substance, an agent for temporarily preventing the oxidation of the alkali metal and a metal which can form an hydroxid wherein the hydrogen can be replaced by the alkali metal.

3. A composition of matter containing an alkali metal and infusorial earth.

4. A composition of matter containing sodium and infusorial earth.

5. A composition of matter containing sodium, an inert substance and an agent for temporarily preventing the oxidation of the sodium.

6. A composition of matter containing an alkali metal, infusorial earth and an agent for temporarily preventing the oxidation of the alkali metal.

7. A composition of matter containing sodium, infusorial earth and an agent for temporarily preventing the oxidation of the alkali metal.

8. A composition of matter containing sodium, an inert substance, an agent for temporarily preventing the oxidation of the sodium and a metal which can form an hydroxid wherein the hydrogen can be replaced by the alkali metal.

9. A composition of matter containing sodium, an inert substance, an agent for temporarily preventing the oxidation of the alkali metal and aluminum.

10. A composition of matter containing sodium, infusorial earth, an agent for temporarily preventing the oxidation of the sodium, aluminum and silicon.

11. A composition of matter containing an alkali metal, an inert substance and a binding material.

12. A composition of matter containing sodium, infusorial earth, a hydrocarbon oleaginous substance, aluminum and silicon.

In testimony whereof I have hereunto signed my name in the presence of two subscribing witnesses.

GEORGE FRED BRINDLEY.

Witnesses:
SEABURY C. MASTICK,
ROBERT W. ASHLEY.